A. E. REUSS & O. SCHNITZLER.
SPEED CHANGING MECHANISM.
APPLICATION FILED JUNE 24, 1911.

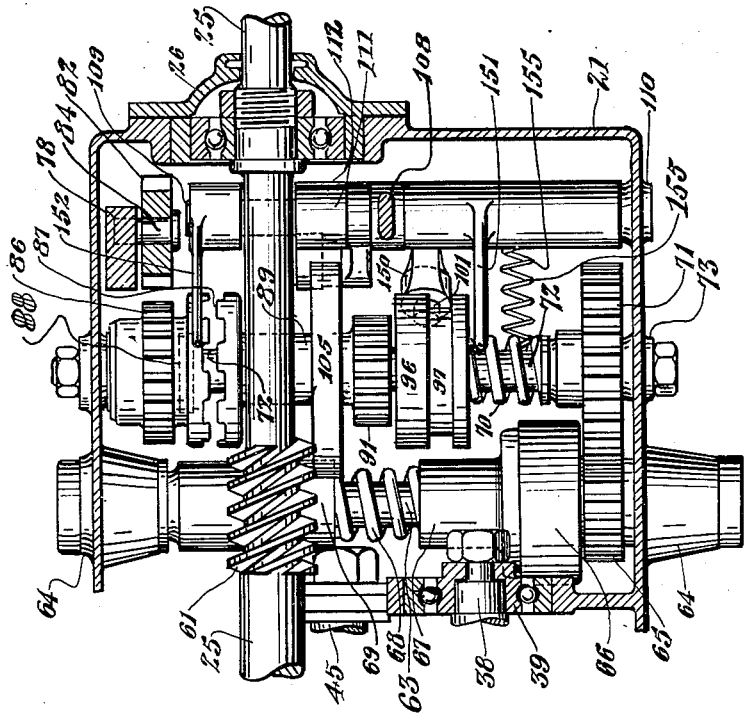

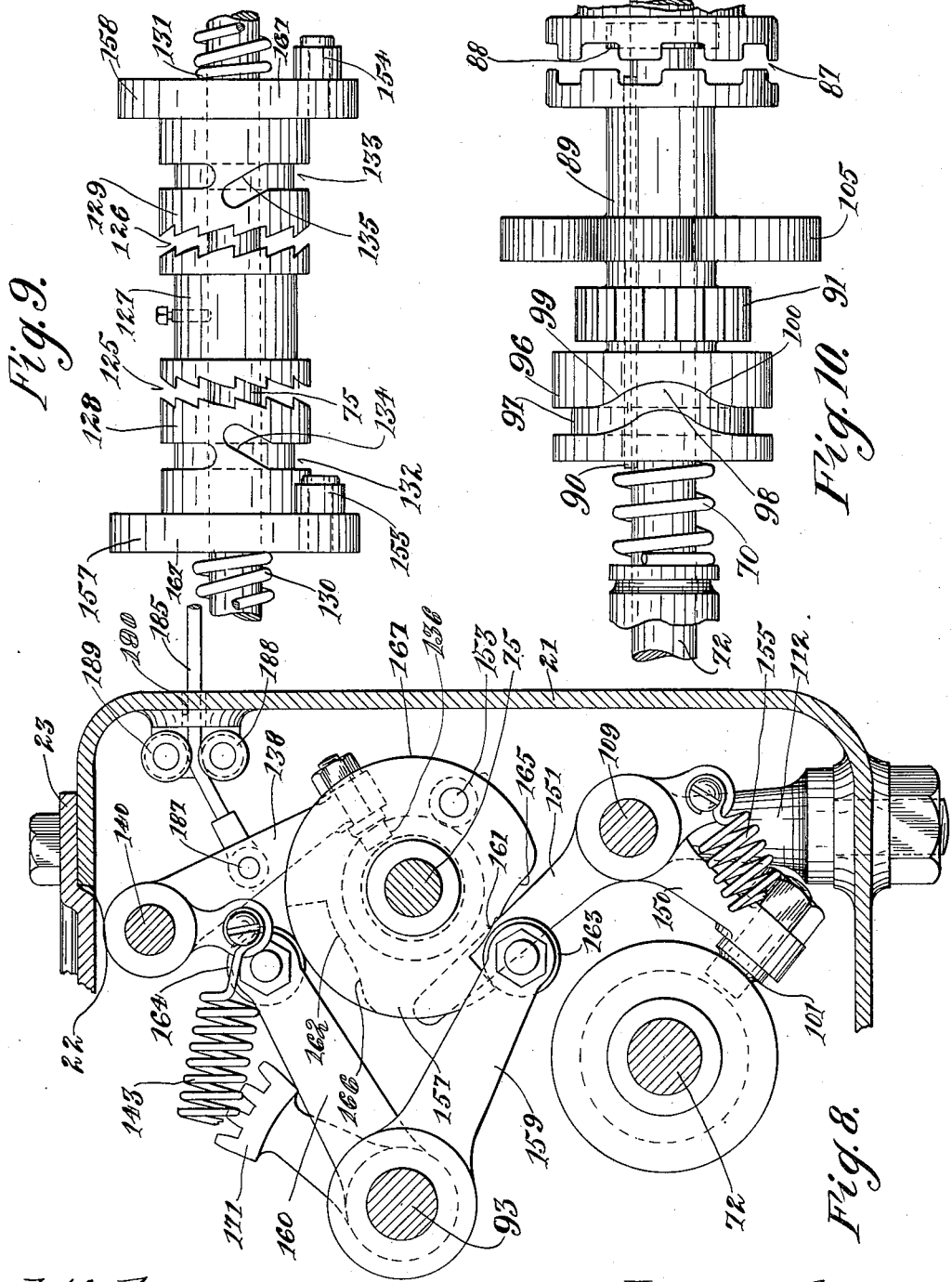

1,058,263.

Patented Apr. 8, 1913.

6 SHEETS—SHEET 6.

Witnesses:
Jacob A. Hollander
Anna M. Ryan

Inventor:
Arthur E. Reuss,
Oscar Schnitzler,
by R. F. Herbslet, their Attorney.

UNITED STATES PATENT OFFICE.

ARTHUR E. REUSS, OF CINCINNATI, AND OSCAR SCHNITZLER, OF REMINGTON, OHIO.

SPEED-CHANGING MECHANISM.

1,058,263.

Specification of Letters Patent. Patented Apr. 8, 1913.

Application filed June 24, 1911. Serial No. 635,127.

*To all whom it may concern:*

Figure 1:
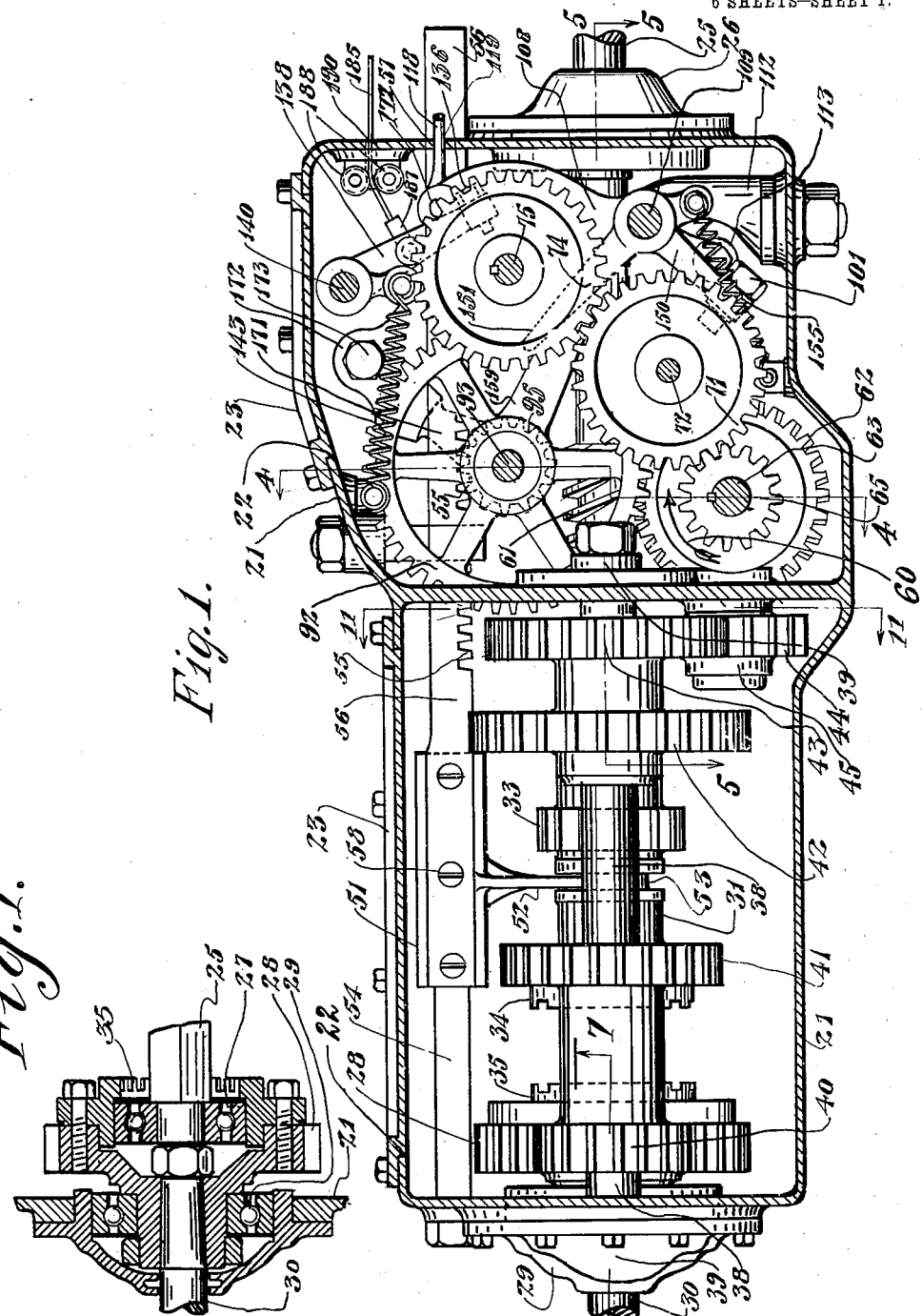
Figure 2:
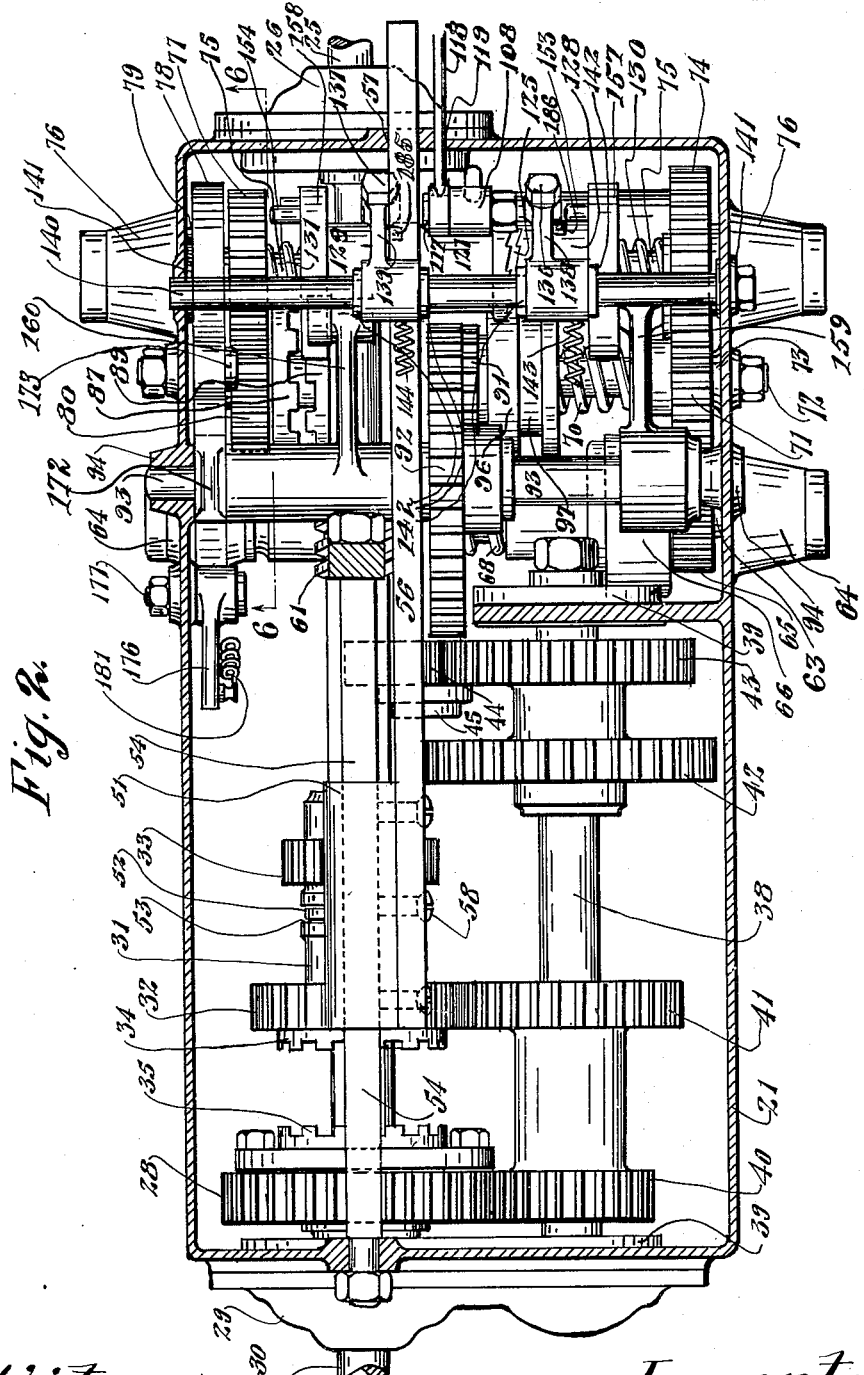
Figure 3:
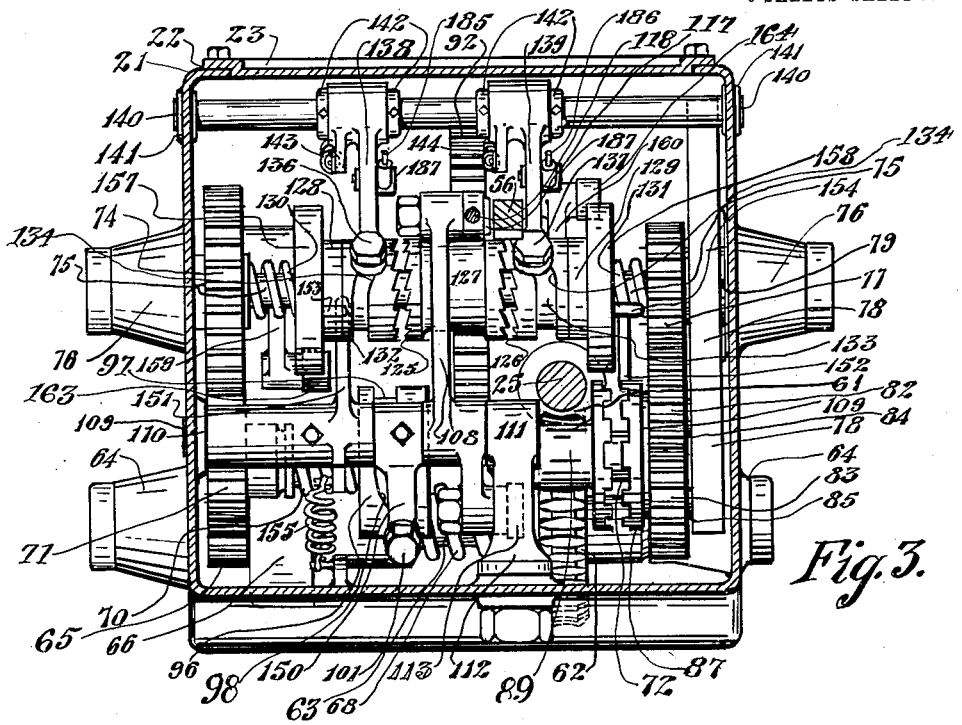
Figure 4:
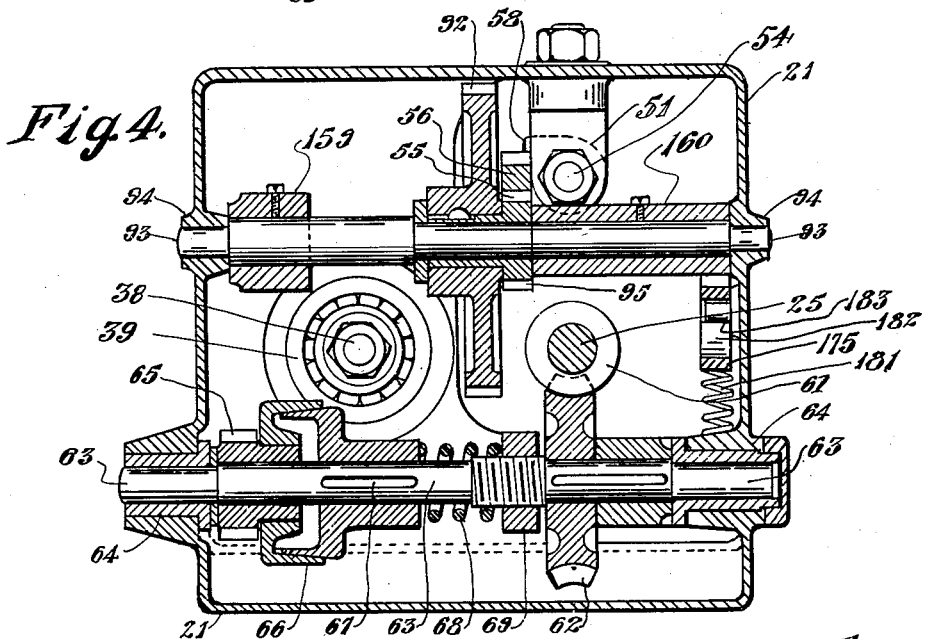
Figure 11:
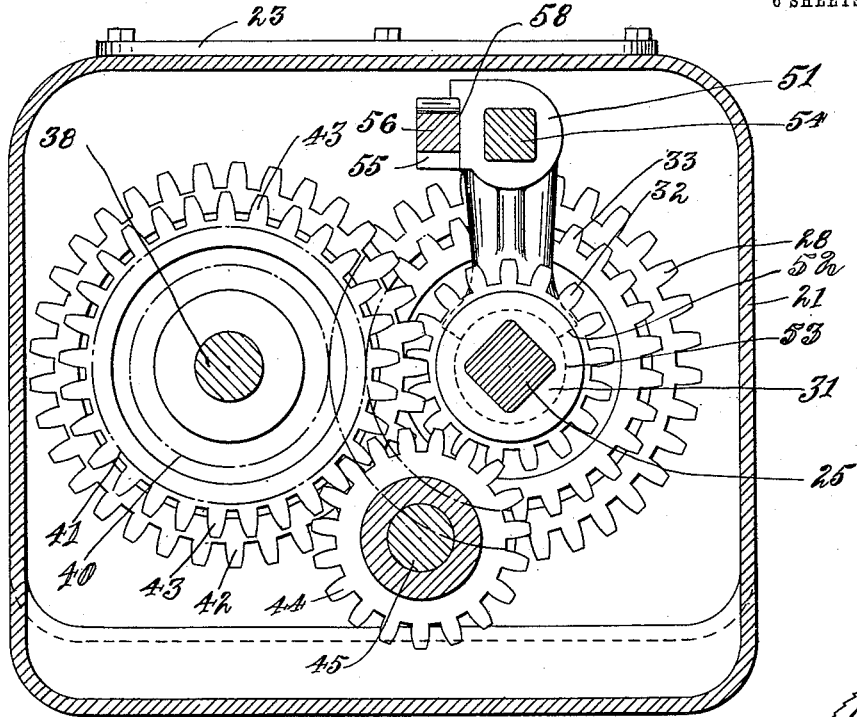
Figure 12:
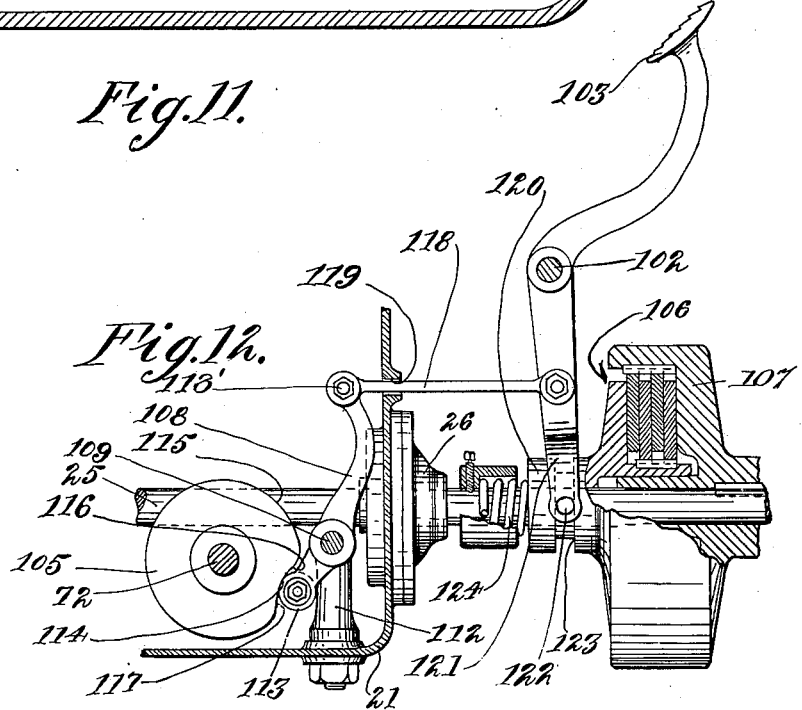

Be it known that we, ARTHUR E. REUSS and OSCAR SCHNITZLER, citizens of the United States, residing, respectively, in Cincinnati and at Remington, in the county of Hamilton and State of Ohio, have jointly invented certain new and useful Improvements in Speed-Changing Mechanism, of which the following is a specification.
Our invention relates to speed changing mechanism, and has for its object the provision of novel means for effecting change in relation between the power applying members for causing change in transmission of power, further the provision of novel means whereby when change in relation between the power applying members is so effected the main drive-clutch will be automatically relieved for permitting ease of operation of the changing member or members; and, further, the provision of novel means for initiating movement in the operating mechanism for effecting speed change.
Our invention is applicable in various relations, particularly so in the power transmission mechanism of motor driven vehicles, and we have instanced the same as applied to an automobile.
The invention will be readily understood from the foregoing, and from the following description and claims, and from the drawings, in which latter:

Figure 1 is a side elevation of our improved device with the front of the casing broken away for better illustration of parts. Fig. 2 is a plan view of our improved device with the top of the casing removed for better illustration of parts. Fig. 3 is a front end elevation of the same with the front of the casing broken away. Fig. 4 is a vertical section on the line 4—4 of Fig. 1. Fig. 5 is a horizontal section on the line 5—5 of Fig. 1. Fig. 6 is a vertical section on the line 6—6 of Fig. 2, showing the reversing rocker-frame. Fig. 7 is a sectional detail of the connection between the driving and driven shafts on the line 7—7 of Fig. 1. Fig. 8 is an end elevation of the initiating and operating cams. Fig. 9 is a side elevation of the initiating cams. Fig. 10 is a side elevation of the operating cam and clutch. Fig. 11 is a vertical cross-section on the line 11—11 of Fig. 1; and, Fig. 12 is an end elevation of the drive-clutch re- leasing cam, and showing its connection with the drive-clutch.

21 represents a casing which may be of suitable form and preferably is a closed casing, having suitable openings therein exemplified at 22, provided with suitable covers exemplified at 23. The casing is capable of being made in suitable sections, suitably secured together for the placement therein of the operative mechanism.

25 represents the drive-shaft, journaled in a suitable bearing 26 in the casing and a bearing 27 supported by a gear 28, the hub of which is journaled in a bearing 29 in the casing, the gear being secured to a suitable driven shaft 30 supported by said last-named bearing. Suitable speed change parts are operatively located between the drive-shaft and the driven shaft. We have shown these of the slidable gear type, although it is obvious that other characters of speed changing parts may be employed when carrying out our invention. In the present exemplification we show a sleeve 31 slidable on the drive-shaft and having on it gears 32, 33, and a clutch-member 34, the other member 35 whereof is operatively rigid with the driven shaft. The sleeve rotates with the drive-shaft.

38 is an intermediate shaft journaled in bearings 39 in the casing and having gears 40, 41, 42 and 43 fast thereon. The gear 40 is in mesh with the gear 28. 44 is a transmitting pinion journaled on a stud 45 on the casing and is in mesh with the gear 43. In the present exemplification three speeds and a reverse movement may be transmitted from the drive-shaft to the driven shaft through the clutch and gears named, although it is obvious that more or less steps in speed may be employed or the reverse movement omitted without departing from the spirit of our invention. When the clutch members are in engagement, direct transmission takes place between the drive-shaft and the driven shaft through the clutch, represented as the high speed. If the sleeve 31 is moved lengthwise for causing the gear 32 thereon to mesh with the gear 41, an intermediate speed is imparted to the driven-shaft. If the sleeve is moved farther lengthwise for causing gear 33 to mesh with gear 42, a slow speed of movement will be imparted to the driven member. If the sleeve is caused to move farther lengthwise in the same direction, gear 33 thereon will be caused to mesh with the transmitting pinion 44 for imparting reverse rotation to the driven member.

51 is a slide for moving the sleeve 31 endwise. It has a fork 52 received in an annular groove 53 in said sleeve. It is slidable on a guide-rod 54 suitably secured to the casing. It is shown operated by means of a rack 55 on a rack-rod 56 slidable longitudinally in a bearing 57 of the casing and has attachment with the slide at 58. The rack-rod is operable in both directions with a step-by-step movement and is arranged to shift the gears 32, 33, endwise for bringing the same into mesh respectively with the gear 41 and the gears 42, 44, or for causing operative engagement or release of the clutch-members. The mechanism we prefer for effecting these movements and operating the speed changing mechanism is as follows: The drive-shaft is provided with a worm 61 which meshes with a worm-wheel 62 on a cross-shaft 63 journaled in bearings 64 of the casing and is arranged to impart rotation to a gear 65, as in the direction of the arrow 60, preferably with a yieldable connection of sufficient resisting force to operate the train of mechanism to be presently described, but constructed to permit yielding thereof in case excessive resistance should be encountered, and thereby prevent accident. This yieldable connection is shown as a friction clutch 66, one member whereof is fast with the gear 65 which is normally loose about the shaft and the other member of which is rotatively secured to the shaft, as by a spline-connection 67, permitting said last-named member to be pressed toward said first-named member of said clutch by a spring 68, the tension of which is adjustable by a nut 69. The gear 65 meshes with a gear 71 which rotates loose about a shaft 72 positioned in bearings 73 of the casing. The gear 71 meshes with a gear 74 fast at one end of a shaft 75 journaled in bearings 76 of the casing, the other end of the shaft having a gear 77 fast thereon.

78 is a rocker-frame pivoted about the shaft 75, as by having a bearing 79 thereabout. This rocker-frame supports a gear 80 on a stud 81 and gears 82 and 83 on studs 84, 85. The gears 80, 82 are in mesh with the gear 77 and the gear 83 is in mesh with the gear 82. Upon swinging of the rocker-frame either gear 80 or 83 may be brought into mesh with a gear 86. During operation of the device continuous movement is preferably imparted to the gears 80, 83, from the worm 61, which acts as a speed-reducer, for rotating the gear 86 in opposite directions dependent upon whether the gear 80 or 83 is in mesh therewith. The gear 86 is fast with one member of an operating clutch 87 of the speed-change operating mechanism, the said gear and clutch-member being rotatable loosely about the shaft 72 and held against endwise movement by a collar 88. The other member of said clutch is located on a clutch-sleeve 89 slidable longitudinally on the shaft 72 and rotatable with said shaft, having spline-connection 90 therewith, and urged endwise for engagement of the operating clutch by a spring 70, suitable mechanism being provided, however, for normally holding said operating clutch out of engagement, which mechanism may, however, be released for causing engagement of said clutch when it is desired that endwise movement of the gear-sleeve 31 shall be effected in either direction. For transmitting motion from the clutch 87 to said gear-sleeve, the clutch-sleeve is provided with a gear 91 which meshes with a gear 92 rotating loosely about a rock-shaft 93 journaled in bearings 94 in the casing. The gear 92 has a pinion 95 fast therewith which meshes with the rack 55.

For causing disengagement of the clutch 87, the clutch-sleeve 89 is provided with a cam 96 comprising a peripheral groove 97 having an offset portion 98 which connects with the annular portion of the groove by oppositely inclined groove-portions 99, 100. The cam-groove is arranged to receive a laterally rigid positioning pin 101 and the parts are so arranged that the pin may be received into the annular portion of the cam-groove when the clutch is in engagement and ride into the offset portion thereof irrespective of the direction of rotation of the clutch-sleeve. When the pin enters said offset portion, the clutch-sleeve is moved laterally for separating the clutch-member thereon from the clutch-member on the gear 86 for causing cessation of movement of said clutch-sleeve and the rack-rod 56 and the gears therebetween. 105 is a cam also preferably located on and rotating with the clutch-sleeve and acts to operate an additional element which may be instanced as a usual drive-clutch shown at 106, between the internal combustion motor, the fly-wheel 107 of which is shown broken away, and the drive-shaft, usually present in the gearing of automobiles or motor vehicles of various descriptions. The cam 105 acts on a lever 108 pivoted about a shaft 109 mounted in a bearing 110 of the casing and a bearing 111 of a pedestal 112 secured to the casing. The lever has a roller 113 against which the cam-face of the cam 105 operates. This cam is shown as having a depressed portion 114 which connects with the high surface 115 of the cam by oppositely sloping faces 116, 117, so that the lever 108 may be moved when the cam 105 rotates in either direction. The lever is suitably connected, as by an articulation 118', with a suitable connection 118, which connects through an opening 119 in the casing with a movable member 120 of the drive-clutch in suitable manner as through the intervention of a forked lever 121 secured to a rocker-shaft 102 which may also have a foot-treadle 103 thereon. The fork of the lever has pins 122 received in an annular groove 123 of the movable member. The device acts to release said drive-clutch when the high surface 115 of the cam rides against the roller in either direction. The drive-clutch is shown of the usual disk-friction type having a spring 124 for pressing the disks toward each other in operative relation.

The parts described operate to cause change in relation in the speed changing parts or reversal of rotation therein and act to release the main clutch. For initiating these movements we provide the following mechanism: 125, 126, are a pair of initiating clutches, one of the members of each of which rotates with the shaft 75, as by being on a hub 127 fast on said shaft. 128, 129 are initiating clutch-sleeves loose about said shaft and slidable lengthwise thereon and having the opposing members of the initiating clutches thereon, the clutch-sleeves being normally urged toward the hub 127 by springs 130, 131, and normally held from engagement therewith by pins 136, 137, acting with cams 132, 133, preferably in the form of peripheral grooves in said clutch-sleeves, the major portions of which are annular about said sleeves and terminate in offset portions 134, 135. When the clutches are in engagement the annular portions of the grooves are in lateral positions for having the pins received therein. When the offset portions of said grooves reach the pins in the rotation of the clutch-sleeves, respectively, the clutch-sleeves will be caused to move laterally for disengaging the clutches. These pins are preferably located on arms 138, 139, rockable loosely about a shaft 140 received in bearings 141 of the casing. The respective arms are held against endwise movement by collars 142, the pins being normally urged toward said cams by springs 143, 144.

The positioning pin 101 is mounted on an arm 150 secured to the shaft 109, which is a rocker-shaft. This rocker-shaft has a pair of arms 151, 152 fast thereon arranged to be actuated from the respective clutch-sleeves 128, 129, for disengaging the pin 101 from the cam 96 for permitting the engagement of the operating clutch 87 when either of the initiating clutch-sleeves 128, 129, is actuated. We prefer to accomplish this by providing the respective initiating clutch-sleeves with contact-parts for said arms shown as pins 153, 154. A spring 155 urges said pin and arms into normal operative positions. One of said initiating clutch-sleeves, instanced as the clutch-sleeve 129, is arranged to act in conjunction with the rack 55 for causing movements of said rack in one direction, as from low to high speed position, and the other of said initiating clutch-sleeves, instanced as the sleeve 128, is arranged to act in conjunction with said rack for moving the same in opposite direction, for effecting respectively steps of speed in increasing or in decreasing ratio. The parts are shown in intermediate speed relation and the train of gearing on the tumbler-plate is shown in such relation to indicate that the step in speed just effected has been a step from low to intermediate speed, the advancing steps being effected when the tumbler gear 80 is in mesh with the gears 77, 86, and the decreasing steps of speed being effected when the gears 82, 83, are respectively in mesh with said gears 77, 86.

For positioning the rocker-frame we provide the respective initiating clutch-sleeves with cams 157, 158, which coöperate with arms 159, 160, fast on the shaft 93. These arms project on opposite sides of a right line drawn between the rotary axes of said cams 157, 158, and the pivotal axes of said arms, so that movement in the same direction of said cams will effect the movement in opposite directions of said arms. The said cams embrace recessed portions 161, 162, in which rollers 163, 164, on said arms are respectively received when the other of said arms is rocked by its cam, the respective cams being provided with inclined faces 165, 166, connecting said recesses with the high portions 167 of said cams. It will be understood that these cams act independently, one of them, 158, when effecting increasing speed ratios and the other, 157, when effecting decreasing speed ratios. If succeeding steps either in increasing or decreasing speed ratio take place, the arms will be acted on only at the first of said steps; and remain in assumed positions throughout the balance of said succeeding steps, for the reason that at the first of said steps the rocker-frame 78 will be swung into position for proper gear-transmission throughout the series of steps in a given direction, preferably by the following mechanism: The rocker-rod 93 has a segment arm 171 thereon which meshes with a segment gear 172 rockable on a stud 173 secured to the casing and meshing with a segment-gear 174 on the rocker-frame for rocking the latter in either direction. The rocker-frame has a positioning-piece 175 which coöperates with a lock 176 shown in the form of a bell-crank lever pivoted about a stud 177 and having a tooth 178 thereon adapted to selectively engage with notches 179, 180, on said positioning-piece and normally held in said notches by a spring 181, permitting said tooth to yield to positive actuation imparted to said positioning-piece by said segment-gears. The positioning-piece has a guide-slot 182 received about a pin 183 on the casing.

The initiating means for the speed-change operating mechanism may be suitably controlled either by hand or automatically by a speed-controller or controllers, an exemplification of which is shown in our co-pending application Serial No. 630,094 filed May 29, 1911, the speed controller or controllers being arranged for operating in steps of increasing or decreasing speed ratios. The releasing pins 136, 137, may have suitable connection with the speed controller or controllers for automatically tripping said pins out of engagement with the initiating clutch-sleeves, as by means of connections 185, 186, or these connections may lead to a suitable manual or other operated device. These connections are instanced as flexible connections having articulation 187 with the respecting arms 138, 139 and received respectively between guide-rollers 188, 189 through an aperture 190 in the casing.

Having thus fully described our invention, what we claim as new and desire to secure by Letters Patent is:

1. In speed changing mechanism, the combination with power transmitting members embracing a member movable for effecting change in speed transmission, a drive-clutch embracing a movable member, a cam-sleeve having operative connection with both said movable members for effecting movement thereof, and reversing gearing for rotating said cam-sleeve in reverse directions.

2. In speed changing mechanism, the combination with power transmitting members embracing a member movable for effecting change in power transmission, a drive-clutch embracing a movable member, a cam-sleeve having operative connection with both said movable members for effecting movement thereof, a pair of cam-sleeves having coincident rotary axes, and reversing gearing pivoted about said last-named axes and having operative connection with said first-named cam-sleeve for selectively rotating the same in opposite directions.

3. In speed changing mechanism, the combination with power transmitting members embracing a member movable for effecting change in power transmission, a drive-clutch embracing a movable member, a cam-sleeve having operative connection with both said movable members for effecting movement thereof, a pair of cam-sleeves having coincident rotary axes, and reversing gearing pivoted about said last-named axes and having operative connection with said first-named cam-sleeve for selectively rotating the same in opposite directions, said last-named operative connection embracing a clutch controlled by said pair of cam-sleeves.

4. In speed changing mechanism, the combination with power transmitting members embracing a member movable for effecting change in power transmission, a rack for moving said movable member, a gear for said rack, a rotatable clutch-member, and a longitudinally movable mating clutch-sleeve therefor, means between said clutch-sleeve and gear for rotating said gear, said clutch-sleeve having a position-controlling cam thereon.

5. In speed changing mechanism, the combination with power transmitting members embracing a member movable for effecting change in power transmission, a rack for moving said movable member, a gear for said rack, a rotatable clutch-member, a longitudinally movable rotating clutch-sleeve therefor, means between said clutch-sleeve and gear for rotating said gear, said clutch-sleeve having a position-controlling cam thereon, a trip for said last-named cam, and a pair of independently operable cams for actuating said trip.

6. In speed changing mechanism, the combination with power transmitting members embracing a member movable for effecting change in power transmission, a rack for moving said movable member, a gear for said rack, a rotatable clutch-member, a longitudinally movable mating clutch-sleeve therefor, means between said clutch-sleeve and gear for rotating said gear, said clutch-sleeve having a position-controlling cam thereon, and means for rotating said rotatable clutch-member in either direction embracing a gear on said clutch-member, a rocker-frame and gearing thereon for said last-named gear, and means for swinging said rocker-frame embracing a cam on each of a pair of independently operable cams.

7. In mechanism of the character described, the combination of a rotatable member; a pair of independently operable clutch-sleeves having cams thereon and having coincident rotary axes, an additional clutch-sleeve, and tripping mechanism for said last-named clutch-sleeve having operative connection with a cam of each of said pair of independently operable clutch-sleeves, said additional clutch-sleeve having operative connection with said rotatable member.

8. In mechanism of the character described, the combination of a rotatable member, a pair of independently operable clutch-sleeves each having cams thereon and having coincident rotary axes, an additional clutch-sleeve, a mating clutch-member therefor, means for urging said last-named clutch-sleeve and clutch-member together, a gear on said mating clutch-member, a rocker-frame and gears thereon for said last-named gear swingable about said coincident rotary axes, means for swinging said rocker-frame pivoted about the rotary axis of said rotatable member, said last-named means and urging means operatively controlled by said cams on said pair of independently operable clutch-sleeves.

9. In speed changing mechanism, the combination with a driving member, a driven member, and power transmitting members embracing a member movable for effecting change in power transmission, a clutch-member having connection with one of said members for being driven thereby, a rotatable member having operative connection with said movable member, a rotatable clutch-member between the latter and said first-named clutch-member normally spaced from said first-named clutch-member, and means for initiating connection between said clutch-members embracing a pair of independently operable cam-members.

10. In mechanism of the character described, the combination of a movable power transmitting part, and means for moving said movable part a series of succeeding steps in either direction embracing a clutch and reversing gearing and initiating means for said clutch and reversing gearing having operative relation with said clutch for engaging the same on each actuation of said initiating means and in active relation with said reversing gearing between reversals of direction of movement of said movable part, substantially for the purpose described.

11. In speed changing mechanism, the combination of a driving member, a driven member, and power transmitting members embracing a member movable for effecting change in power transmission, and means for operating said movable member embracing a worm having yielding friction connection with one of said first-named members, adjusting means for said yielding friction connection, and a worm-wheel in mesh therewith for the purpose described.

12. In speed changing mechanism, the combination of a driving member, a driven member, and power transmitting members embracing a member movable for effecting change in power transmission, and means for operating said movable member embracing a worm having yieldable friction connection with one of said first-named members and further embracing a worm-wheel in mesh with said worm for the purpose described.

13. In mechanism of the character described, the combination of a pair of clutch-sleeves and rotatable mating clutch-members therefor having coincident rotary axes, means for normally urging said respective clutch-sleeves and mating clutch-members together, each of said clutch-sleeves having a separating cam thereon, a trip for each of said cams, a second clutch normally spaced apart, a trip therefor, and a cam on each of said first-named clutch-sleeves for said last-named trip, substantially as described.

14. In mechanism of the character described, the combination of a movable power transmitting member, a pair of clutch-sleeves having coincident rotary axes, a clutch-sleeve having a different rotary axis and operative connection with said movable power transmitting member, tripper mechanism between said pair of clutch-sleeves and last-named clutch-sleeves and independent tripper means for each of said pair of clutch-sleeves, substantially for the purpose described.

15. In mechanism of the character described, the combination of a movable power transmitting member, a rotatable member for moving the latter, a pair of clutch-sleeves having coincident rotary axes, an additional clutch-sleeve having a different rotary axis and operative connection with said rotatable member, a rocker-frame and gearing therefor between said axes, a shifting member therefor pivoted about the rotary axis of said rotatable member and comprising an arm extending to each side of a right line between said last-named rotary axis and the rotary axes of said pair of clutch-sleeves, a cam on each of the latter for said respective arms, tripper-mechanism between said pair of clutch-sleeves and said additional clutch-sleeve, and tripping means for each of said pair of clutch-sleeves, substantially as described.

16. In speed changing mechanism, the combination with power transmitting members comprising a member movable for effecting change in power transmission, of means for moving said movable member embracing a cam movable in opposite directions, means for selectively controlling the direction of movement of said cam comprising a pair of independently operable clutches, and independent cam mechanism for controlling said clutches.

17. In speed changing mechanism, the combination with power-transmitting members embracing a member movable for effecting change in power of transmission, a clutch-sleeve having operative connection therewith, a mating clutch-member for the latter, means for rotating said clutch-member in reverse directions, means for normally urging said clutch-sleeve toward said mating clutch-member, and cam-mechanism for said clutch-sleeve for separating said clutch comprising a cam having an annular cam-portion and an offset portion connecting with said annular portion by oppositely inclined portions, for the purpose described.

18. In mechanism of the character described, the combination of a rocker-frame and a gear having coincident pivotal and rotary axes, oppositely rotating transmitting gears on said rocker-frame, a gear with which either of said last-named gears is arranged to mesh by swinging of said rocker-frame, and means for swinging said rocker-frame comprising a pair of cams having rotary axes coincident with said first-named axes, a pair of rocker-arms extending at the respective sides of a right line between the rocking axes of said pair of arms and the rotary axes of said cams, and a connecting means between said pair of arms and said rocker-frame.

19. In speed changing mechanism, the combination with power transmitting members comprising a member movable for effecting change in power transmission, of means for moving said movable member embracing a rotatable part, a train of gearing embracing a rocker-frame and gearing for rotating said rotable part in revrese directions, and means for rocking said rocker-frame comprising a plurality of arms having pivotal axes coincident with the rotary axis of said rotatable part.

20. In mechanism of the character described, the combination of a plurality of clutch and cam-mechanisms having coincident rotary axes, a clutch and cam-mechanism having a different rotary axis, and reversing gearing between said first-named clutch and cam-mechanisms and said second-named clutch and cam-mechanism for rotating the latter in both directions from the former for the purpose described.

21. In mechanism of the character described, the combination of rotatable clutch-member, a pair of clutch-sleeves arranged for being selectively engaged therewith, an operating clutch, and a trip for the latter having independent operative connection with both said first-named clutch-sleeves.

22. In mechanism of the character described, the combination of a movable power transmitting member, a rotatable member, connecting means between the latter and said power transmitting member for moving said power transmitting member, a pair of clutch-sleeves and rotatable mating clutch-members therefor having coincident rotary axes, means for normally urging said respective clutch-sleeves and mating clutch-members together, each of said clutch-sleeves having a clutch-separating cam thereon, a trip for each of said cams, a second clutch normally spaced apart, a trip therefor, a cam on each of said first-named clutch-sleeves for said last-named trip, the normally inactive member of said second-named clutch having a cam thereon, a main drive clutch, and a releasing member for the latter having operative connection with said last-named cam.

23. In mechanism of the character described, the combination of a movable power transmitting member, a rotary member, connecting means between the latter and said power transmitting member for moving said power transmitting member, a pair of clutch-sleeves and rotatable mating clutch-members therefor having coincident rotary axes, means for normally urging said respective clutch-sleeves and mating clutch-members together, a second clutch normally spaced apart, a trip therefor, reversing gearing for said second-named clutch, shifting means for the latter, and cams on each of said pair of clutch-sleeves for said last-named trip and for said shifting means, substantially as described.

24. In mechanism of the character described, the combination of a movable power transmitting member, a rotatable member, connecting means between the latter and said power transmitting member for moving said power transmitting member, a pair of clutch-sleeves and rotatable mating clutch-members therefor having coincident rotary axes, a gear therefor, an additional clutch member having a gear thereon, a rocker-frame and gearing thereon between said gears for transmitting rotation between said gears in reverse directions, and shifting means for said rocker-frame pivoted about the rotary axis of said rotatable member, each of said pair of clutch-sleeves having a cam thereon for said shifting means for moving the latter in opposite directions.

In testimony whereof, we have signed our names hereto in the presence of two subscribing witnesses.

ARTHUR E. REUSS.
OSCAR SCHNITZLER.

Witnesses:
C. E. HOPKINS,
ANNA M. RYAN.